United States Patent [19]

Varma et al.

[11] Patent Number: 4,693,838

[45] Date of Patent: Sep. 15, 1987

[54] MULTIFUNCTIONAL VISCOSITY INDEX IMPROVER

[75] Inventors: Vijaya K. Varma, Belle Mead; Esther D. Winans, Colonia; Rosemary O'Halloran, Union, all of N.J.; Phillip W. Brewster, Camlachie, Canada

[73] Assignee: Exxon Chemical Patents Inc., Linden, N.J.

[21] Appl. No.: 792,538

[22] Filed: Oct. 29, 1985

[51] Int. Cl.$^4$ .......................................... C10M 145/10
[52] U.S. Cl. ........................... 252/51.5 R; 252/51.5 A; 252/56 R; 252/56 D; 525/256; 525/382
[58] Field of Search ............. 252/56 R, 56 D, 51.5 A; 525/256, 301

[56] References Cited

U.S. PATENT DOCUMENTS

| | | | |
|---|---|---|---|
| 3,316,177 | 4/1967 | Dorer, Jr. | 252/51.5 |
| 3,326,804 | 6/1967 | Hu | 252/34 |
| 4,036,766 | 7/1977 | Yamamoto et al. | 252/51.5 A |
| 4,036,767 | 7/1977 | Yamamoto et al. | 252/51.5 A |
| 4,036,768 | 7/1977 | Crawford et al. | 252/51.5 A |
| 4,089,794 | 5/1978 | Engel et al. | 252/51.5 A |
| 4,092,255 | 5/1978 | Chapelet et al. | 252/50 |
| 4,137,185 | 1/1979 | Gardiner et al. | 252/33 |
| 4,144,181 | 3/1979 | Elliott et al. | 252/33 |
| 4,146,489 | 3/1979 | Stambaugh et al. | 252/50 |
| 4,160,739 | 7/1979 | Stambaugh | 252/34 |
| 4,161,452 | 7/1979 | Stambaugh et al. | 252/50 |
| 4,170,561 | 10/1979 | Chapelet et al. | 252/51.5 A |
| 4,388,202 | 6/1983 | Nagano et al. | 252/56 R |
| 4,517,104 | 5/1985 | Bloch et al. | 252/51.5 A |
| 4,557,847 | 12/1985 | Gutierrez et al. | 252/51.5 A |

Primary Examiner—Jacqueline V. Howard
Attorney, Agent, or Firm—F. T. Johmann; W. G. Muller

[57] ABSTRACT

Hydrocarbon polymers such as ethylene copolymers may be reacted with unsaturated nitrogen-containing monomers or unsaturated carboxylic acids in a synthetic hydrocarbon lubricating oil in the presence of a free radical initiator such as a peroxide. The copolymer grafted directly with the nitrogen-containing monomers may be utilized as an additive for oil compositions, particularly lubricating oil compositions as a V.I.-dispersant additive. The polymer reacted with carboxylic acid may be further reacted with amines or aminoalcohols to also form a multifunctional V.I.-dispersant additive.

44 Claims, No Drawings

MULTIFUNCTIONAL VISCOSITY INDEX IMPROVER

BACKGROUND OF THE INVENTION

1. Field of the Invention

The invention relates to polymeric viscosity index (V.I.) improver - dispersant additives for lubricating oils. This invention also relates to processes for preparing grafted and amine functionalized olefin polymers and their use in oil compositions, and includes an improved solution process for grafting unsaturated moieties, e.g. maleic anhydride, vinyl monomers, etc. onto the olefin polymer by carrying out the graft reaction in a solution medium comprising certain polymeric hydrocarbon diluents.

2. Prior Disclosures

Olefin or hydrocarbon high molecular weight polymers such as hydrogenated copolymers of isoprene and butadiene, copolymers of butadiene and styrene, and ethylene copolymers, particularly ethylene-propylene copolymers are known as viscosity index (V.I.) improving additives for oil compositions, particularly lubricating oil compositions. A substanial body of prior art exists directed towards further reacting these ethylene V.I. improvers to form a multi-functional V.I. improver. This is a material useful as a V.I. -dispersant oil additive so as to improve not only the V.I. properties of the oil but to also impart dispersancy so as to suspend sludge that may form during the operation or use of the lubricant and to inhibit varnish deposition in engines. Examples of such prior art include patents which teach grafting ethylene copolymers with maleic anhydride, followed by reaction with an amine, such as U.S. Pat. Nos. 4,137,185, 4,144,181 and 4,089,794. Similarly, prior patents, such as U.S. Pat. Nos. 4,092,255, 4,146,489 and 4,170,561, were directed towards grafting the ethylene copolymer directly with a nitrogen compound such as vinyl pyridines and vinyl pyrrolidones.

The early patents such as U.S. Pat. Nos. 3,316,177 and 3,326,804 taught the general concept of grafting an olefin polymer, e.g. ethylene-propylene copolymer, with maleic anhydride and then reacting with a polyalkylene polyamine such as polyethylene amines. Subsequently, U.S. Pat. No. 4,089,794 was directed to using an oil solution for free radical peroxide grafting the ethylene copolymer with maleic anhydride and then reacting with the polyamine. This concept had the advantage that by using oil, the entire reaction could be carried out in an oil solution to form an oil concentrate, which is the commercial form in which such additives are sold. This was an advantage over using a volatile solvent for the graft reaction, which has to be subsequently removed and replaced by oil to form a concentrate.

U.S. Pat. Nos. 4,036,766 and 4,036,767 disclose improved polymeric additives from acrylic and methacrylic acids, useful in lubricating oil and ATF to impart desirable viscosity temperature characteristics, prepared by polymerizing the acrylic monomer components in the presence of a polyalkene-1. These references indicate that the polyalkene solvent may form a complex with or otherwise associates with the polymethacrylate to increase the solubility of the polymethacrylate in the oil. U.S. Pat. No. 4,036,768 contains a similar disclosure in the preparation of these interpolymers having the same viscosity advantages except that the polymerization is carried out in the presence of a liquid polyalkyl benzene which is believed to provide improvements in dispersancy and oxidative stability by the same polymer solvent association or complexing.

SUMMARY OF THE INVENTION

The present invention provides a dispersant-viscosity index improver by grafting by free radical in a synthetic oil, the high molecular weight olefin polymer with a nitrogen containing monomer, or an unsaturated acid which is then further reacted as with an amine or polyol. The high molecular weight olefin polymer is generaly solid even at grafting temperatures, so that dilution is required for processing. After grafting with an unsaturated acid or N-containing monomer, mineral lubricating oil may be added to form the finished additive concentrate. If grafting with an unsaturated acid which is to be further reacted, then mineral oil can be used as another diluent to carry out the additional reaction and to form a useful additive concentrate.

The synthetic oil is preferably one having good low temperature properties and is preferably a low molecular weight polymer or an alkylated benzene. By grafting in a synthetic oil, apparently some of the synthetic oil also grafts or complexes with the high molecular olefin polymer. By selecting a synthetic oil of a high enough molecular weight, for example above 50 carbon atoms or a mol. wt. above 700, the synthetic oil will have dispersant activity when grafted. An improvement is obtained over the use of mineral oil where the grafted mineral oil molecules are generally of too low a molecular weight to be effective as dispersants, and in fact will generally have a negative effect on dispersancy.

The use of mineral oil as solvent for the grafting will also produce oil insoluble by-products causing excess sediment and requiring more extensive filtration. By using a synthetic oil compatible with mineral lubricating oil, which minimize low molecular weight insoluble components, sediment and haze can be substantially reduced and the unsaturated and or nitrogencontaining unsaturated monomer is more efficiently utilized.

Hydrocarbon and derivatized hydrocarbon, e.g. ethylene-propylene V.I., and VI dispersant polymers, are generally incompatible with other classes of polymers such as polyesters, e.g. polyacrylates or polymethacrylates. Furthermore, these derivatized hydrocarbon polymers are generally incompatible with various other components, (usually dispersant inhibitors or DI ) used to formulate mixtures of additives which make engine, transmission, and industrial oils. These polymer components, in a typical additive package for engine oil, will form a 40–80% of the total adpack. It is invariably necessary for the customer to provide separate storage facilities for the VI and for the DI components, and to weigh and to mix each into the base lubricating oil at a blending facility. Additives of the invention have improved compatibility, e.g.with DI materials, and concentrates of this mixture have been prepared which will not re-separate into layers on standing even at elevated temperatures (which lowers viscosity and thus accelerates any tendency to separate). As a result, the invention allows the additive manufacturer to offer a finished stable adpack, which will save the cost of separate storage and multiple weighings (with possible errors) at the final blending. In several of the following examples, stable ATF adpacks were even produced from 3 components; the VI dispersant of this invention, a polymethacrylate VI dispersant, and a DI package of conventional dispersant or detergent-inhibitor components, formulated to meet low temperature fluidity performance in the finished blend.

DESCRIPTION OF PREFERRED EMBODIMENT

Olefin Polymer

Oil soluble olefin polymers used in the invention generally will have a number average molecular weight ($\overline{MHD}$ n) of from about 5000 to about 500,000; preferably 10,000 to 200,000 and optimally from about 20,000 to 100,000. In general, polymers useful as V.I. improvers will be used. These V.I. improvers will generally have a narrow range of molecular weight, as determined by the ratio of weight average molecular weight $\overline{MHD}$ w) to number average molecular weight ($\overline{MHD}$ n). Polymers having a $\overline{MHD}$ w/$\overline{MHD}$ n) of less than 10, preferably less than 7, and more preferably 4 or less are most desirable. As used herein ($\overline{MHD}$ n) and $\overline{MHD}$ w) are measured by the well known techniques of vapor phase osmometry (VPO), membrane osmometry and gel permeation chromotography.

Examples of suitable hydrocarbon polymer include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkylaromatic, cycloaliphatic, etc. Frequently they will be of ethylene with $C_3$ to $C_{30}$ olefins, preferably copolymers of ethylene and propylene. Examples of polymers of other olefins include butene, isobutylene, polymers and copolymers of $C_6$ and higher alpha olefins, atactic isoprene and/or butadiene, etc.

The preferred polymers are prepared from ethylene and ethylenically unsaturated hydrocarbons including cyclic, alicyclic and acyclic materials containing from 3 to 28 carbons, e.g. 2 to 18 carbons. These ethylene copolymers may contain from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alphaolefins, such as 4-methyl-1-pentene, 4-methyl-1-hexene, 5-methylpentene-1, 4,4-dimethyl-1-pentene, and 6-methylheptene-1, etc., and mixtures thereof.

The term copolymer as used herein, unless otherwise indicated, includes terpolymers, tetrapolymers, etc., of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6octadiene.

b. Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5-cyclooctadiene; 1,5-cyclo-dodecadiene; 4-vinylcyclohexene; 1-allyl, 4-isopropylidene cyclohexane; 3-allyl-cyclopentene; 4-allyl cyclohexene; and 1-isopropenyl-4-(4butenyl) cyclohexane.

d. Multi-single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethyl norbornene; 5-methylene-6-methyl2-norbornene; 5-methylene-6, 6-dimethyl2-norbornene; 5-propenyl-2- norbornene; 5-(3-cyclopentenyl)-2-norbornene and 5-cyclohexylidene-2-norbornene; norbornadiene; etc.

Ethylenically Unsaturated Carboxylic Acid Material

These materials which may be grafted onto the hydrocarbon polymer contain 3 to 10 carbon atoms and at least one ethylenic unsaturation and at least one, preferably two, carboxylic acid groups, or an anhydride group, or a polar group which is convertible into said carboxyl groups as by oxidation or hydrolysis. Maleic anhydride or a derivative thereof is preferred as it does not homopolymerize appreciably but attaches onto the polymer to give two carboxylic acid functionalities. Such preferred materials have the generic formula

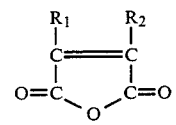

wherein $R_1$ and $R_2$ are hydrogen or a halogen. Suitable examples additionally include chloro-maleic anhydride, itaconic anhydride, hemic anhydride or the corresponding dicarboxylic acids, such as maleic acid or fumaric acid or their monoesters, etc.

As taught by U.S. Pat. No. 4,160,739 and U.S. Pat. No. 4,161,452 various unsaturated comonomers may be grafted on the olefin polymer together with the unsaturated acid component, e.g. maleic anhydride. Such graft monomer systems may comprise one or a mixture of comonomers different from the unsaturated acid component and which cntain only one copolymerizable double bond and are copolymerizable with said unsaturated acid component. Typically, such comonomers do not contain free carboxylic acid groups and are esters containing $\alpha$, $\beta$-ethylenic unsaturation in the acid or alcohol portion; hydrocarbons, both aliphatic and aromatic, containing $\alpha$, $\beta$-ethylenic unsaturation, such as the $C_4$-$C_{12}$ alpha olefins, for example isobutylene, hexene, nonene, dodecene, etc.; styrenes, for example styrene, $\alpha$-methyl styrene, p-methyl styrene, p-sec. butyl styrene, etc.; and vinyl monomers, for example vinyl acetate, vinyl chloride, vinyl ketones such as methyl and ethyl vinyl ketone, etc. Comonomers containing functional groups which may cause crosslinking, gelation or other interfering reactions should be avoided, although minor amounts of such comonomers (up to about 10% by weight of the comonomer system) often can be tolerated.

Unsaturated Nitrogen Containing Monomer

Nitrogen containing unsaturated compounds are well known in forming polymers useful as oil additives. These monomers may be used for grafting onto the olefin polymer and include, among others those having 6 to 30 carbon atoms and 1 to 4 nitrogen atoms.

Nitrogen containing acrylate and methacrylate monomers may be used such dimethylaminoethyl methacrylate or acrylate; acrylamides and methacrylamides such as N-(1,1-dimethyl-3-oxobutyl)acrylamide, N-(1,2-dimethyl-1-ethyl-3-oxobutyl) acrylamide, N-(1,3-diphenyl-1-methyl-3-oxoproyl) acrylamide, N-(1-methyl-1phenyl-3-oxobutyl)methacrylamide, N,N-diethylaminoethyl acrylamide, 2-hydroxyethyl acrylamide, N-dimethylaminopropyl acrylamide and methacrylamide.

N-vinylcaprolactams may be used. Additionally useful are N-vinylpyrrolidone, N-vinylthiopyrrolidone, 3-methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl1-vinylpyrrolidone, 4,5-dimethyl-1-vinylpyrrolidone.

Vinyl pyridines may be used, such as 2-vinylpyridine, 4-vinylpyridine, and lower alkyl ($C_1$-$C_8$) substituted C-vinylpyridines, such as 2-methyl-5-vinylpyridine, 2-methyl-4-vinylpyridine, 2-vinyl-5-ethyl pyridine, 2-vinyl-6-methylpyridine, etc.

Grafting of the Olefin Polymer

In accordance with the present invention, grafting of the polymer, which is usually a rubbery or elastomeric solid at 70° F., is conducted in a solution in synthetic hydrocarbon lubricating oil or diluent at a concentration of about 3 to 90, e.g. 10 to 75 wt. %, preferably a minor amount, say 5 up to 50, e.g. 10 to 30 wt. % of polymer based on the weight of the solution. Suitable hydrocarbon diluents include polymers of olefins and alkyl benzenes. Suitable polyolefins include liquid polyalkenes of number average molecular weight (Mn) of 200 to 10,000, e.g. 300 to 3000, most preferably 350 to 1300 mol. wt. derived from monoethylenically unsaturated olefinic, preferably alkene-1 monomers, of 3 to 18, e.g. 3 to 12 carbon atoms. Suitable polyolefins include poly $C_3$-$C_4$ polymer of olefins especially polyisobutylene of 200 to about 2000, e.g. 400 to 1300, such as about 500 to 900 molecular weight polydecene, polymers of mixtures of $C_6$ to $C_{18}$ alpha olefins, etc.

Suitable liquid alkylbenzenes are mono and poly alkylbenzenes including those mono and polyalkylated benzenes where the alkyl groups may have 1 to 300, e.g. 10 to 30 carbon atoms each, with dialkyl benzene of molecular weight 200 to 800 being preferred.

The grafting is preferably carried out using free radical initiators such as peroxides and hydroperoxides and preferably those which have a boiling point greater than about 100° C. and which decompose thermally within the grafting temperature range to provide said free radicals. Representative of these free-radical initiators are azobutyro-nitrile, 2,5-dimethyl-hex-3-yene-2, 5 bis-tertiary-butyl peroxide (sold as Lupersol 130) or its hexane analogue, ditertiary butyl peroxide and dicumyl peroxide. The initiator is generally used at a level of between about 0.005% and about 1%, based on the total weight of the polymer solution, and temperatures of about 25° to 220° C., preferably 150°-200° C.

The ethylenically unsaturated carboxylic acid material, preferably maleic anhydride, will be generally used in an amount ranging from about 0.05% to about 10%, preferably 0.1 to 2.0%, based on weight of the initial solution. The aforesaid carboxylic acid material and free radical initiator are generally used in a weight percent ratio range of 3.0:1 to 30:1, preferably 1.0:1 to 6.0:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.05 to 12 hours, preferably from about 0.1 to 6 hours, more preferably 0.5 to 3 hours. The graft reaction will be usually carried out to at least approximately 4 times, preferably at least about 6 times the half life of the free-radical initiator at the reaction temperature employed, e.g. with 2,5-dimethyl hex-3-yne-2,5-bis(t-butyl peroxide) 2 hours at 160° C. and one hour 170° C., etc.

In the grafting process, usually the polymer to be grafted, which will generally be solid at 70° F., is dissolved in the liquid synthetic oil (normally liquid at 70° F.) by heating to form a solution and thereafter said nitrogen containing monomer or unsaturated carboxylic acid material, and initiator are added with agitation, although they could have been added prior to heating. When the reaction is complete, the excess acid or monomer material may be eliminated by an inert gas purge, e.g. nitrogen sparging. Preferably any carboxylic acid material that is added is kept below its solubility limit in the polymer solution. For example, maleic anhydride is kept below about 1 wt. %, preferably below 0.4 wt. % or less, of free maleic anhydride based on the total weight of polymer-solvent solution, e.g. ethylene copolymer-synthetic lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

When grafting with unsaturated acid, then prior to further reaction the grafted product in the synthetic oil may be diluted with mineral oil of lubricating viscosity. This provides a suitable solvent media for further functionalization and for the final product which is a concentrated solution of the dispersant-viscosity index improver additive. Also, when the grafting is of an unsaturated nitrogen-containing monomer mineral lubricating oil may be added to form a concentrate. In either case, generally about 40 to 500 wt. % of mineral lubricating oil may be added, based on the total weight of the initial solution of polymer in the synthetic oil.

The Amine Component

The grafted polymer solution in the synthetic oil, e.g. polymeric hydrocarbon or alkylbenzene, preferably diluted with mineral lubricating oil, may be reacted with a suitable amine in a conventional manner using reactants and conditions known in the art.

Useful amine compounds for neutralization of the acid, e.g. maleic anhydride grafted ethylene copolymer include mono- and polyamines of about 2 to 60, e.g. 3 to 20, total carbon atoms and about 1 to 12, e.g., 2 to 7 nitrogen atoms in the molecule. These amines may be hydrocarbyl amines or may be hydrocarbyl amines including other groups, e.g., alkoxy groups, amide groups, imidazoline groups, and the like.

Useful amines include those of the formulas:

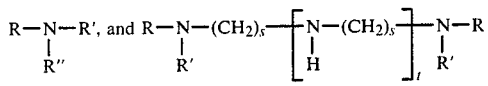 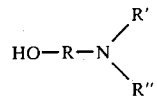

wherein R, R', and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; each s can be the same or different number of from 2 to 6, preferably 2 to 4; and t is a number of from 0 to 10, preferably 2 to 7.

Non-limiting examples of suitable amine compounds include: 1,2-diaminoethane; 1,3-diaminopropane; 1,4-diamonobutane; 1,6-diaminohexane; polyethylene amines such as diethylene triamine; triethylene tetramine; tetraethylene pentamine; polypropylene amines such as 1,2-propylene diamine; di-(1,2-propylene diamine; di-(1,2-propylene)triamine; di-(1,3-propylene) triamine; N,N-dimethyl-1,3-diaminopropane; N,N-di(2-aminoethyl) ethylene diamine; N,N-di(2-hydroxyethyl)1,3-propylene diamine; 3-dodecyloxy-propylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl)morpholine; etc.

Other suitable amines include: 3-dodecyloxypropylamine; mono-tallow amine; amino morpholines such as N-(3-aminopropyl) morpholine and N-(2-aminoethyl) morpholine; substituted pyridines such as 2-amino pyridine, 2-methylamino pyridine and 3-methylamino pyridine; and others such as 2-aminothiazole; 2-amino-2thiazoline; 2-amino pyrimidine; 2-amino benzothiazole; methyl-1-phenyl hydrazine and para-morpholino aniline, etc.

Useful amines also include piperidines and piperazines of the general formula

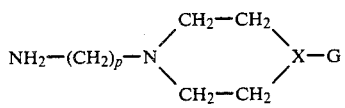

where X is CH-G (piperidines) or N-G (piperazines) where G is hydrogen or alkyl groups of 1 to 3 carbon atoms while p is 1 to 6.

Useful amines include pyridines of the structures:

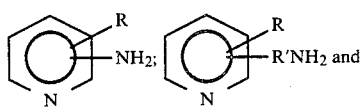

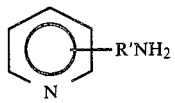

where R is a $C_1$ to $C_{24}$, e.g. $C_1$ to $C_8$ hydrocarbon group, e.g. alkyl group and R' is a $C_1$ to $C_{24}$, e.g. $C_1$ to $C_8$ alkylene group.

Alcohol tertiary amines may also be used, such as those of the formula where R is a $C_2$ to $C_{24}$ alkylene group while R' and R" are alkyl groups of 1 to 10 carbons, e.g. methyl, n-butyl, isobutyl, etc.

Especially preferred are amines having a single primary amine group, with any other amine groups present being tertiary amine groups. This inhibits cross-linking which is particularly important when the polymer has a relatively high degree of acidity, e.g. above 0.1 meq./g. of polymer. Mixtures comprising about 70 wt. % or more of amines having only a single primary or secondary amine group may be used with small amounts of amines having two or more primary or secondary amine groups. Acidities below 0.1 meq./g. polymer are less sensitive to cross-linking and amines with 2 or more reactive groups, i.e. either primary or secondary amine groups, or both primary and secondary amine groups, or a primary amine group and an alcohol group, may be used.

The polyamines will be generally used in the range of 0.1 to 10 wt. %, preferably 0.5 to 5 wt. %, based on the weight of the olefin polymer. The polyamine is preferably used in an amount that neutralizes the acid moieties by formation of amides, imides or salts.

Preferably the amount of polyamine used is such that there is 1 to 2 moles of polyamine reacted per equivalent mole of dicarboxylic acid. For example, with an ethylene-propylene copolymer of 40,000 number average molecular weight, grafted with an average of 4 maleic anhydride groups per molecule, preferably about 4 to 8 molecules of polyamine is used per molecule of grafted ethylene-propylene copolymer.

Reaction of Acid Grafted Polymer with Amine Component

The polymer, grafted with acidic moieties, preferably in solution generally equal to about 5 up to 50 wt. %, preferably 10 to 30 wt. % polymer, can be readily reacted with amines by heating at a temperature of from about 100° C. to 250° C., preferably from 120° to 230° C., for from about 0.5 to 10 hours, usually about 1 to about 6 hours. The heating is preferably carried out to favor formation of imides and amides. Reaction ratios can vary considerably, depending upon the reactants, amounts of excess, type of bonds formed, etc.

Compositions

A minot amount, e,g. 0.001 up to 50 wt. %, preferably 0.005 to 25 wt. %, of the nitrogen-containing grafted oil-soluble olefin polymers produced in accordance with this invention can be incorporated into a major amount of an oleaqinous material, such as a lubricating oil depending upon whether one is forming finished products or additive concentrates. When used in lubricating oil compositions, e.g., automotive or diesel crankcase lubricating oil, automatic transmission formulations, etc. the final nitrogen-containing grafted olefin polymer concentrations are usually within the range of about 0.01 to 10 wt. %, e.g., 0.1 to 6.0 wt. %, preferably 0.25 to 3.0 wt. %, of the total composition. The lubricating oils to which the products of this invention can be added include not only hydrocarbon oil derived from petroleum, but also include synthetic lubricating oils such as esters of dicarboxylic acids; complex esters made by esterification of monocarboxylic acids, polyglycols, dicarboxylic acids and alcohols; polyolefin oils, etc.

The V.I. and V.I.-dispersant nitrogen-containing graft polymers of the invention may be utilized in a concentrate form, e.g., in a minor amount from about 5 wt. % up to about 50 wt. %, preferably 7 to 25 wt. %, in a major amount of oil, e.g. said synthetic lubricating oil with or without additional mineral lubricating oil, for ease of handling.

The above oil compositions may contain other conventional additives, such as ashless dispersants, for example the reaction product of polyisobutylene succinic anhydride with polyethyleneamines of 2 to 10 nitrogens, which reaction product may be borated; antiwear agents such as zinc dialkyl dithiophosphataes; viscosity index improvers such as polyisobutylene, polymethacrylates, copolymers of vinyl acetate and alkyl fumarates, copolymers of methacrylates with amino methacrylates; corrosion inhibitors, oxidation inhibitors, friction modifiers, metal detergents such as overbased calcium magnesium sulfonates, phenate sulfides, etc.

The following examples, wherein all parts or percentages are by weight unless otherwise noted, which include preferred embodiments, further illustrate the present invention.

EXAMPLES 1 to 6

A series of products were prepared as detailed in Table 1 below. The procedure in all cases was to add an ethylene-propylene copolymer (EP) to the solvent media and heat at about 150° C. until the EP was dissolved. Thereafter the temperature of the reaction mixture was increased to 190° C. and the maleic anhydride and peroxide catalyst (t-butyl peroxide) were added in three equal portions at approximately 10 minute intervals. Relative to ethylene-propylene copolymer 10% maleic anhydride (by weight) was used in the grafting reaction and 50% peroxide was used relative to the weight amount of maleic anhydride. After the grafting reaction was completed there was added indicated amounts of solvent 150 neutral (S150N), a paraffinic mineral oil having a minimum viscosity of 31 cs (centistokes) at 37.8° C. Samples were taken to determine the Sap. No. and sediment. The product was again heated to 190° C. and neutralization with the amine was carried out at 190° C. until water ceased coming off and thereafter the finished product was sparged with nitrogen for 1 hour at 190° C. and was tested for nitrogen content and haze.

The ethylene-propylene copolymer used in Examples 1 to 4 was a V.I. improver for lubricating oil and consisted of about 48 wt. % ethylene and about 52 weight % propylene. It had a Thickening Efficiency (T.E.) of about 2.1 which represents a weight average molecular weight of approximately 100,000. It was an amorphous copolymer elastomeric solid at 70° F. with a $\overline{MHD}$ w/$\overline{MHD}$ n of about 2:1, and a K.O. shear stability index of 30%. The same copolymer was used in Examples 5 and 6 except that it was reduced in molecular weight to a T.E. of about 1.25.

Thickening Efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of 0° F., (Solvent 150 Neutral) to a viscosity of 12.4 centistokes at 98.9° C., to the weight percent of a test copolymer required to thicken the same oil to the same viscosity at the same temperature. T.E. is related to ($\overline{MHD}$ n) and is a convenient, useful measurement for formulation of lubricating oils of various grades. Polymers with T.E.'s of 1 to 2.8 or higher are frequently used as viscosity modifiers, e.g. V.I. improvers.

The alkyl benzene (AB-1) used in Example 1 is a heavy alkylate made by alkylating benzene with a polypropylene olefin. Designated Zerice S - 100, it is a synthetic basestock for industrial lubricants having a calculated average molecular wt. of 425 and a viscosity of about 90–100 cs at 40° C.

Polyisobutylene (PIB) of 900 $\overline{MHD}$ n (number average molecular weight) was used in Example 2, while 500 $\overline{M}_n$ PIB was used in Example 3.

The polyalpha olefin (PAO) oils were commercially available as Mobil SHF-41 which typically had a viscosity of 4 centistokes (cs) at 210° F. and a viscosity of about 2900 cs at −40° F.; and Mobil SHF-401 which had a viscosity of about 39.5 cs. at 210° F. and about 36,200 cs. at 0° F. Mobil SHF-41 is made from alpha decene, was a mixture of about 1 to 2 wt. % of decene dimer, about 85 to 90 wt. % of decene trimer and about 10 wt. % of decene tetramer, with a number average molecular weight of about 420–470. Mobil SHF-401 was a decene oligomer having a number average molecular weight of about 1500 and a weight average molecular weight of about 2300. Both SHF-41 and SHF-401 are synthetic hydrocarbon fluids which can be used as a base stock for synthetic engine and industrial lubricating oil products, SHF-41 being a light viscosity oil and SHF-401 a high viscosity oil.

The amines used were propane diamine (PDA); N-amino-propyl morpholine (NAPM); diethylene triamine (DETA); iminobis-propylamine (IBPA); and a commercial polyethyleneamine mixture (PAM) averaging between about 5 to 6 nitrogens per molecule.

The composition of the products of Examples 1 to 6 are summarized in Table 1 which follows.

TABLE 1

| EX. | EP T.E. | EP, Parts | MA Parts | Reaction Medium Type | Reaction Medium Parts | S150N Parts | Sap. No. (1) | Sediment cc (2) | Amine | N, wt. % | Appearance | Haze (3) in Nephelos |
|---|---|---|---|---|---|---|---|---|---|---|---|---|
| 1 | 2.1 | 12 | 0.7 | AB | 48 | 40 | 7.7 | 0.01 | PDA | 0.30 | fluid, no gel | 12 |
| 2 | 2.1 | 12 | 0.7 | 900PIB | 48 | 40 | 6.4 | — | NAPM | 0.17 | no gel, clear | 32 |
| 3 | 2.1 | 12 | 0.5 | 500PIB | 28 | 60 | 4.1 | 0.007 | DETA | 0.15 | no gel, clear | 20 |
| 4 | 2.1 | 12 | 0.7 | PAO4cs | 48 | 40 | 7.2 | 0.004 | PDA | 0.23 | no gel | 15 |
| 5 | 1.25 | 7.9 | 0.4 | PAO40cs | 23.7 | 68.4 | 4.6 | 0.004 | PAM | 0.21 | no gel | NR |
| 6 | 1.25 | 12 | 0.4 | PAO40cs | 28 | 60 | 4.7 | 0.0075 | PAM/ | 0.16 | dk, clear, | NR |

TABLE 1-continued

| EX. | EP T.E. | EP Parts | MA* Parts | Reaction Medium Type | Reaction Medium Parts | S150N Parts | Sap. No. (1) | Sediment cc (2) | Amine | N, wt. % | Appearance | Haze (3) in Nephelos |
|---|---|---|---|---|---|---|---|---|---|---|---|---|
| | | | | | | | | | IBPA | | no gel | |

(1) TBAH (tertiary butyl ammonium hydroxide) titration.
(2) 10 V % product in 90 V % heptane.
(3) <40 nephelos is acceptable. Run 5% product in S150N.
NR = Not Run.

The sediment test of Table 1 was carried out by diluting 10 volumes of the graft product of that example with 90 volumes of heptane, then centrifuging 100cc of the diluted sample and measuring the amount of sediment in cubic centimeters. The haze test was carried out by diluting 5 vol. of the aminated final product with 95 vol. of Solvent 150 Neutral. Gel-free, homogeneous products with low sediment and haze were obtained without filtration.

EXAMPLE 7

84 g. of ethylene-propylene copolymer (T.E.=1.25) was dissolved in a mixture of 108 g. of said polyalphaolefin oil (40 cs. at 210° F.) and 108 g. of said alkyl benzene by heating and stirring at 160°–180° C. for two hours in a one liter baffled flask. The resulting mix was then heated to 190° C. and grafted using a total of 4.2 g. of maleic anhydride and 2.1 g. of di-t-butyl peroxide, then soaked for one hour and then nitrogen sparged for one hour. 300 g. of Solvent 150 Neutral (S150N) mineral oil was added and blended at 190° C. for one hour. At this point, a sample showed a TBAH Sap. No. of 7.7 (calculated value 8.0) with a 0.01 volume % sediment (measured in 10 vol. % concentration in heptane). The product while still at 190° C. was treated with 5.0 g. of 1,3-propane-diamine in 5 g. of xylene, heated one hour, nitrogen sparged one hour, then filtered through celite. The final product contained 0.18% nitrogen and had a viscosity of 403 cs. at 210° F. One month oven storage at 63° C. raised the viscosity value to 443 cs. at 210° F. The concentrate contained about 30 wt. % of the nitrogen-containing grafted olefin polymer, assuming all grafting occurred on the copolymer only, calculated as follows:

$$30\% = \frac{84 + 4.2 + 5}{84 + 4.2 + 5 + 108 + 108} \times 100$$

EXAMPLE 8

The product of Ex. 7 was formulated in an automatic transmission fluid at 1.5 wt. % (about 0.45 wt. % of the nitrogen-containing grafted olefin polymer) together with 1.5 wt. % of a commercially available polymethacrylate viscosity modifier (about 50 wt. % active ingredient) and conventional amounts of other ATF additives in a Dispersant - Inhibitor (DI) package. This DI package was an oil solution of polyisobutenyl succinimide type dispersant, zinc dihydrocarbyl dithiophosphate, antioxidants, corrosion inhibitors, and other conventional additives. The product had good low temperature viscosity properties as indicated by a Brookfield viscosity of 39,500 centipoise at −40° C. and passed the General Motor's Dexron ® II Turbohydromatic ® Oxidation Test as follows:

| Viscosity, cs at 100° C. | |
|---|---|
| 0 hours | 5.99 cs |
| 100 hours | 6.64 cs |
| 300 hours | 5.72 cs |
| Total Acid Number | 4.50 |
| Pentane insolubles | 0.83 |
| Benzene insolubles | 0.07 |
| Viscosity, −10° F. | 2980 cP.(centipoise) |
| Viscosity, −40° F. | 167,000 cP. |
| Copper, ppm | 116 |
| Sludge | Pass |

EXAMPLES 9 to 19

These examples were prepared following the general procedure of Examples 1 to 7. The following materials were used:

PAO was polyalphaolefin of 40 cs. at 210° F. from Mobil (SHF 41) made from alpha decene and having a $\overline{MHD}$ n (number average molecular weight) of about 1500.

Unhydrogenated PAO also had a viscosity of 40 cs. at 210° F. was from Uniroyal Chemical Canada, has a $\overline{MHD}$ n of 948 and a Bromine Number of 7.1.

AB-2 is a heavy alkylated benzene with a side chain length of 26 carbons.

The resulting compositions are summarized in Table II which follows:

TABLE 2

| EX. | EP T.E. | EP Parts | MA Parts | Reaction Medium Type | Reaction Medium Parts | S150N Parts | TBAH Sap No. | Sediment cc. | Amine | N, wt. % |
|---|---|---|---|---|---|---|---|---|---|---|
| 9 | 2.1 | 12 | 3.6 | PAO 40cs | 88 | 0 | 31.8 | 0.020 | NAPM | 0.8 |
| 10 | 1.25 | 12 | 1.0 | PAO 40cs | 88 | 0 | 10.3 | NR | DETA | 0.27 |
| 11 | 1.25 | 12 | 0.4 | PAO 40cs | 18 | 70 | 4.3 | 0.026 | DETA | 0.12 |
| 12 | 1.25 | 12 | 0.6 | PAO 40cs | 36 | 52 | 6.6 | 0.007 | PDA | 0.15 |
| 13 | 1.25 | 12 | 0.3 | AB-1 | 36 | 52 | 6.1 | 0.008 | NAPM | 0.17 |
| 14 | 1.25 | 12 | 0.6 | AB-1 PAO | 18 18 | 52 | 5.7 | 0.007 | PDA | 0.14 |
| 15 | 1.25 | 14 | 0.7 | AB-1 PAO | 18 18 | 50 | 7.7 | 0.010 | PDA | 0.18 |
| 16 | 2.8 | 12 | 0.8 | AB-1 | 48 | 40 | 7.8 | 0.005 | NAPM | 0.18 |
| 17 | 1.25 | 12 | 1.2 | Unhydrog. PAO | 88 | 0 | 11.0 | 0.006 | DETA | 0.30 |
| 18 | 1.25 | 12 | 0.6 | Unhydrog. PAO | 36 | 52 | 5.5 | 0.009 | PDA | 0.13 |

TABLE 2-continued

| EX. | EP T.E. | EP Parts | MA Parts | Reaction Medium Type | S150N Parts | TBAH Parts | Sediment Sap No. | cc. | Amine | N, wt. % |
|---|---|---|---|---|---|---|---|---|---|---|
| 19 | 1.25 | 12 | 0.6 | AB-2 | 36 | 52 | 6.0 | 0.023 | NAPM | 0.17 |

Note: Sap. No. and Sediment before amination.

EXAMPLE 20

Part A

The additive of Example 11 was made up into a VI-DI (viscosity index improver - dispersant inhibitor) additive package (adpack) using 16% wt. % of the product of Example 11 with 16 wt. % of a commercial polymethacrylate V.I., (PMA-VI) additive concentrate, with the remaining 68 wt. % being a dispersant-inhibitor package of the type described in Example 8.

Part B

Part A was repeated but using 16 wt. % of the product of Example 12 in place of that of Example 11. The resulting VI-DI adpacks of Parts A and B were homogeneous when made and remained that way after 2 weeks storage at 63° C. showing no separation.

Comparison

Part A was repeated but in place of the product of Example 11, the following VI-dispersant (VID) materials were used:

VID-A was an ethylene-propylene copolymer grafted with maleic anhydride and reacted with a polyamine and polyisobutenyl succinic anhydride according to U.S. Pat. No. 4,517,104.

VID-B was an ethylene-propylene copolymer grafted with maleic anhydride and reacted with polyamine and sulfonic acid according to U.S. Pat. No. 4,144,181.

VID-C was an ethylene-propylene copolymer grafted with vinyl pyrrolidone.

The above VI-DI adpacks compositions were tested for compatibility. In addition, the VI-dispersant additive concentrates per se, i.e. the products of Examples 11 and 12, along with PMA-VI, VID-A, VID-B and VID-C were tested for storage stability by storing 200 grams of the material in a pint bottle in an oven at 63° C. and then measuring the viscosity at 100° C. in terms of centistokes after one month and calculating the total % viscosity increase. The viscosity is also measured at the end of the first two weeks and the thickening is calculated as the % per hour increase in centistoke viscosity. Sonic breakdown tests were also run on the products of Examples 11 and 12 and compared to that for PMA-VI as well as typical values for VID-A, VID-B and VID-C. The results are summarized in Table 3 which follows.

TABLE 3

| Additive | Vis. inc. % 1 Mo. @ 63° C. | VI-DI Adpack Storage 2 Wks. @ 63° C. | % Thickening 2 Wks. @ 63° C. | Sonic Breakdown, % |
|---|---|---|---|---|
| VID-A | 5% | Sep. ½" | 0.47 | typically 20% |
| VID-B | — | 3 Layers | 0.42 | typically 20% |
| VID-C | — | Sep. 1" | 0.47 | typically 20% |
| PMA-VI | 9.8% | No Sep. | 0.71 | 55 |
| Ex. 11 | 5–11% | No Sep. | 0.31 | 18 |
| Ex. 12 | 5–11% | No Sep. | 0.42 | 26 |

As seen by Table 3, the additives of Examples 11 and 12 typically increased 5 to 11% in centistoke viscosity at 100° C. after 1 month storage at 63° C. and showed no separation in the adpack after 2 weeks at 63° C. thereby demonstrating good compatibility with the dispersant-inhibitor (D.I.) package and the PMA-VI polyester component of the adpack. In contrast, the pint bottle showed a ½ inch layer of the adpack had separated when using VID-A, while use of VID-B caused separation into three layers containing the PMA-VI, the dispersant-inhibitor package and the VID-B, while VID-C gave a 1 inch layer of separation.

The products of Examples 11 and 12 showed a slow rate of thickening and good shear stability as measured by sonic shear breakdown.

EXAMPLE 21

Adpacks were made up similar to Example 20, Part A, but in place of the 16% of the product of Example 1 there was used 16 wt. % of each of the products of Examples 13 to 19. These adpacks were tested for compatibility after 2 weeks at 63° C. Finished Automatic Transmission Fluids were made up using 9.3 wt. % of each adpack in mineral lubricating oil and the blends were tested for viscosity at 100° C., Brookfield viscosity at −40° F. measured in centipoise (cs) and for sludge inhibiting ability as measured by the LMOT oxidation test.

The LMOT test is carried out using 50 ml of the test fluid containing 2.0 g iron filings plus 5 ml. copper naphthenate oxidation catalyst, which test fluid is heated to 300° F. and 25 ml. of air per minute is bubbled through the test fluid. Daily samples are taken and blotter spots of the samples are observed for sludge. The number of days it takes for visible sludge to appear reflects the anti-oxidation and anti-sludging effect of the composition.

The compositions and their test results are summarized in Table 4 which follows.

TABLE 4

| | | | Blend, 9.3% Adpack[1] in Base Oils | | |
|---|---|---|---|---|---|
| EXAMPLE | Vis. Inc. % 1 mo. @ 63° C. | VI-DI Adpack 2 wks. @ 63° C. | Vis/100° C., cs | BR/−40° F. cP | LMOT, Days To Sludge |
| 12 | — | No Sep. | 5.93 | 35,000 | 11–12 |
| 13 | 9.5 | No Sep. | 5.77 | 35,000 | 11–12 |

TABLE 4-continued

| EXAMPLE | Vis. Inc. % 1 mo. @ 63° C. | VI-DI Adpack 2 wks. @ 63° C. | Blend, 9.3% Adpack[1] in Base Oils | | LMOT, Days To Sludge |
| --- | --- | --- | --- | --- | --- |
| | | | Vis/100° C., cs | BR/−40° F. cP | |
| 14 | 11.2 | No Sep. | 5.86 | 40,000 | 10 |
| 15 | 10.0 | No Sep. | 6.32 | 39,500 | 12 |
| 16 | — | No Sep. | — | — | — |
| 17 | 8.8 | No Sep. | 6.05 | 39,000 | 9 |
| 18 | 7.0 | No Sep. | 6.06 | 39,000 | 8 |
| 19 | 5.0 | No Sep. | — | — | 15 |

[1]16% example of invention plus 16% commercial polymethacrylate V.I. improver plus 68% ATF-DI package. See example 20.

Table 4 shows that the additives of the invention gave viscosity increases of 5 to 11.2% in centistokes at 210° F. after one month storage at 63° C., which is in an acceptable range. The VI-DI adpacks (similar to Example 20) after 2 weeks at 63° C. showed no phase separation thereby indicating good compatibility. The ATF formulation containing 9.3 wt. % of the adpacks showed good low temperture viscosity characteristics as indicated by the Brookfield (BR) test at −40° F., giving viscosities in the range of 35,000 to 40,000 centipoises. The LMOT test shows the inventive additives had good anti-oxidant properties.

EXAMPLE 22

A blending experiment was made to determine the ability of the synthetic oil to dissolve (lower the viscosity) ethylene-propylene copolymer of about 48 wt. % ethylene and about 52 wt. % propylene having a T.E. of 2.8. Ten wt. % of the rubbery copolymer and 90% synthetic oil were mixed for three hours at 180° C. and the viscosity determined. The results are in Table 5 below.

TABLE 5

| Medium | Viscosity cSt. at 210° F. |
| --- | --- |
| Heavy Alkyl Benzene (AB-1) | 559 |
| Polyalphaolefin, 40 cs. | 5,123 |
| Polyisobutylene, 900 mol. wt. | 18,731 (Incomplete). |

Table 5 shows that even the high molecular weight (2.8 T.E.) polymer can be readily dissolved to give a fluid solution to facilitate further reaction or handling. The alkyl benzene is particularly preferred for ease of dissolving and handling the hydrocarbon polymer. The polyisobutylene, on the other hand would require further heating in order to complete the dissolution.

EXAMPLE 23

105 grams of 1.25 T.E. ethlene-propylene copolymer (about 48 wt. % ethylene and 52 wt. % propylene) is blended for two hours at 190° C. with alkylated benzene (AB-1). The mix is cooled to 80° C. Then 1.4 grams of 2-vnyl-pyridine and 0.2 g. t-butyl-perbenzoate in 2 grams of AB-1 is added, followed by heating to 140° C. slowly (one-half hour) under nitrogen cover. After 40 minutes at 140° C., 0.2 grams of t-butyl-perbenzoate is added and the mixture is held at 140° C. for one hour, followed by nitrogen sparging for 1.5 hours at 200° C. A filtration showed nothing on the celite and the clear product analyzed 0.10 wt. % nitrogen.

EXAMPLE 24

A sample of high molecular weight polyisobutylene (PIB) of a T.E. of about 1 was made by dialyzing Paratone N (a commercial V.I. improver for lubricating oil) to remove the oil. 20 grams of PIB were dissolved in 80 g. of heavy benzene alkylate (AB-1) and heated to 190° C. under nitrogen. 0.8 gram of maleic anhydride and 0.4 gram of t-butyl-peroxide were added in two portions during a half-hour period. The mixture was then soaked one hour and nitrogen sparged for another hour. One gram of propane diamine was added all at once, followed by soaking 0.5 hour and nitrogen sparging 1.5 hours at 190° C. The product analyzed 0.25 wt. % nitrogen.

What is claimed is:

1. A process comprising solution grafting a normally solid hydrocarbon polymer of $C_2$ to $C_{28}$ olefin, said polymer having a number average molecular weight in the range of about 5,000 to 500,000 with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in a synthetic hydrocarbon oil having a number average molecular weight of about 200 to 10,000.

2. A process according to claim 1, wherein said hydrocarbon polymer is a hydrogenated copolymer of styrene with at least one aliphatic diene selected from the group consisting of butadiene and isoprene.

3. A process according to claim 2, wherein said hydrocarbon polymer is a hydrogenated polymer of blocks of styrene with blocks of said diene.

4. A process according to claim 1, wherein said hydrocarbon polymer is a copolymer of ethylene with a $C_3$ to $C_{28}$ alpha olefin.

5. A process acording to claim 4, wherein said hydrocarbon polymer is polyisobutylene.

6. A process comprising grafting with a free radical initiator, an amount of an oil-soluble ethylene copolymer comprising about 15 to 90 weight % ethylene and about 10 to 85 weight % of $C_3$ to $C_{28}$ alpha-olefin, said copolymer having a number average molecular weight within the range of about 5,000 to 500,000 with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, dissolved in a major amount of a synthetic hydrocarbon oil having a number average molecular weight of 200 to 10,000 and selected from the group consisting of alkylated benzene and polymers of $C_3$ to $C_{18}$ monounsaturated olefins.

7. A process according to claim 6, wherein said copolymer is grafted with said unsaturated material by mixing said copolymer, dissolved in a polyolefin synthetic lubricating oil, unsaturated material and free radical initiator at about 120° to 250° C. for about 0.1 to 12 hours.

8. A process according to claim 6, wherein said copolymer is grafted with said unsaturated material by heating said copolymer dissolved in alkylated benzene and adding unsaturated material and free radical initiator at about 120° to 250° C. and heating for about 0.1 to 12 hours.

9. A process according to claim 7, wherein about 5 to 50 % of said copolymer is dissolved in 95 to 50 wt. % of synthetic hydrocarbon lubricating oil to form a solution and the amount of said unsaturated material is about 0.05 to 10 wt. %, based upon the weight of said solution and the amount of said initiator is about 0.005 to 1 wt. %, based on the weight of said solution, and wherein after grafting, about 40 to 500 wt. %, based upon the weight of said solution, of mineral lubricating oil is added, followed by addition within the range of 0.1 to 10 wt. %, based upon the weight of olefin polymer, of amine sufficient to neutralize said acid, followed by heating to 100 to 250° C. for 0.5 to 10 hours.

10. A process according to claim 9, wherein said unsaturated material is said unsaturated carboxylic acid or anhydride.

11. A process according to claim 10, wherein said unsaturated material is maleic anhydride.

12. A process according to claim 11, wherein the graft olefin polymer material in said synthetic oil is diluted with a mineral lubricating oil and reacted with an amine having 2 to 60 carbon atoms and 1 to 12 amine groups to form an oil soluble Viscosity-Index improving - dispersant additive concentrate.

13. A process according to claim 12, wherein said carboxylic acid material is maleic anhydride and said amine is a polyamine having at least one primary amine group.

14. A process according to claim 6, wherein said copolymer consists essentially of about 30 to 80 weight % ethylene and about 20 to 70 weight % propylene, and has a number average molecular weight in the range of about 10,000 to 200,000.

15. A process according to claim 6, wherein said unsaturated material is said nitrogen-containing ethylenically unsaturated monomer.

16. A process according to claim 15, wherein said nitrogen containing monomer is selected from the group consisting of vinyl pyridines, vinyl pyrrolidones, acrylates and methacrylates.

17. A process according to claim 14, wherein said ethylene copolymer consists of ethylene and propylene.

18. The product produced by a process acording to claim 1.

19. The product produced by a process according to claim 3.

20. The product produced by the process according to claim 4.

21. The product produced by the process according to claim 5.

22. The product produced by the process according to claim 8.

23. The product produced by the process according to claim 9.

24. The product produced by the process according to claim 13.

25. The product produced by the process according to claim 15.

26. An oil composition comprising a major amount of lubricating oil, and a V.I.-dispersant additive a minor amount of a nitrogen-containing grafted oil-soluble hydrocarbon polymer of $C_2$ of $C_{28}$ olefin having a number average molecular weight in the range of about 5,000 to 500,000 grafted with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in a synthetic hydrocarbon oil having a number average molecular weight of about 200 to 10,000, and when said unsaturated material is (A) said acid being reacted with amine of 2 to 60 carbon atoms and 1 to 12 nitrogen atoms.

27. A composition according to claim 26, wherein said hydrocarbon polymer is a hydrogenated copolymer of styrene with at least one aliphatic diene selected from the group consisting of butadiene and isoprene.

28. A composition according to claim 26, wherein said hydrocarbon polymer is polyisobutylene.

29. A composition according to claim 26, wherein said hydrocarbon polymer is a copolymer of ethylene with a $C_3$ to $C_{28}$ alpha olefin.

30. A composition according to claim 29, wherein said hydrocarbon polymer consists essentially of ethylene and propylene.

31. A lubricating oil composition comprising a major amount of lubricating oil and a V.I.-dispersant additive concentrate prepared by grafting an oil-soluble ethylene copolymer comprising about 15 to 90 weight % ethylene and about 10 to 85 weight % of $C_3$ to $C_{28}$ alpha-olefin, said copolymer having a number average molecular weight within the range of about 5,000 to 500,000 with an unsaturated material selected from the group consisting of: (A) ethylenically unsaturated $C_3$ to $C_{10}$ carboxylic acid having 1 to 2 carboxylic acid groups or an anhydride group, and (B) nitrogen-containing ethylenically unsaturated monomers containing 6 to 30 carbon atoms and 1 to 4 nitrogen atoms, in a synthetic hydrocarbon oil selected from the group consisting of alkylated benzene and polymers of $C_3$ to $C_{18}$ monounsaturated olefins and which has a number average molecular weight within the range of about 200 to 10,000 and when said unsaturated material is (A) further reacting the resulting graft solution with polyamine of 2 to 60 carbon atoms and 2 to 12 nitrogen atoms, and wherein the amount of said concentrate is sufficient to incorporate about 0.01 to 10 wt. % of a nitrogen-containing grafted oil soluble copolymer in said lubricating oil composition.

32. A lubricating oil composition according to claim 31, wherein said synthetic hydrocarbon oil is alkylated benzene.

33. A lubricating oil composition according to claim 31, wherein said synthetic hydrocarbon oil is said polymer of $C_3$ to $C_{18}$ monounsaturated olefin.

34. A lubricating oil composition according to claim 31, wherein copolymer consisting essentially of ethylene and propylene is grafted with maleic anhydride and reacted with polyamine, and wherein said copolymer is grafted in the presence of alkyl benzene.

35. A lubricating oil composition according to claim 34, wherein said benzene is alkylated with groups each having about 10 to 30 carbon atoms.

36. A lubricating oil composition according to claim 33, wherein copolymer consisting essentially of ethylene and propylene is grafted with maleic anhydride and reacted with polyamine, and wherein said copolymer is grafted in the presence of a synthetic hydrocarbon oil which is a polymer of $C_3$ to $C_{18}$ monounsaturated olefin.

37. A lubricating oil composition according to claim 36, wherein said synthetic hydrocarbon oil is polyisobutylene of 200 to 2,000 mol. wt.

38. A lubricating oil composition according to claim 36, wherein said synthetic hydrocarbon oil is a polymer of decene-1.

39. A process according to claim 9 wherein said synthetic hydrocarbon lubricating oil has a number average molecular weight of above 700.

40. The product produced by the process according to claim 39.

41. A lubricating oil composition according to claim 31, wherein said synthetic hydrocarbon oil is selected from the group consisting of alkylated benzene and polymers of $C_3$ to $C_{18}$ monounsaturated olefins and has a number average molecular weight within the range of above 700.

42. A lubricating oil composition according to claim 41, wherein said copolymer consisting essentially of ethylene and propylene is grafted with maleic anhydride and reacted with polyamine, and wherein said copolymer is grafted in the presence of a synthetic hydrocarbon oil which is a polymer of $C_3$ to $C_{18}$ monounsaturated olefin.

43. A lubricating oil composition according to claim 42, wherein said synthetic hydrocarbon oil is polyisobutylene of above 700 to 2,000 mol. wt.

44. A lubricating oil composition according to claim 42, wherein said synthetic hydrocarbon oil is a polymer of decene-1.

* * * * *